(12) United States Patent  
Yamato et al.

(10) Patent No.: US 8,102,486 B2  
(45) Date of Patent: Jan. 24, 2012

(54) DISPLAY PANEL AND DISPLAY DEVICE

(75) Inventors: Asahi Yamato, Tokyo (JP); Kiyoshi Nakagawa, Yokohama (JP); Toshihiro Yanagi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 398 days.

(21) Appl. No.: 12/441,105

(22) PCT Filed: Jun. 6, 2007

(86) PCT No.: PCT/JP2007/061413  
§ 371 (c)(1),  
(2), (4) Date: Mar. 12, 2009

(87) PCT Pub. No.: WO2008/038439  
PCT Pub. Date: Apr. 3, 2008

(65) Prior Publication Data  
US 2010/0014028 A1    Jan. 21, 2010

(30) Foreign Application Priority Data  
Sep. 28, 2006   (JP) .................................. 2006-265796

(51) Int. Cl.  
  *G02F 1/133*   (2006.01)  
  *H01L 23/62*   (2006.01)  
  *H01L 21/8234*  (2006.01)
(52) U.S. Cl. ............................ 349/72; 257/360; 438/237
(58) Field of Classification Search .................. None  
See application file for complete search history.

(56) References Cited

U.S. PATENT DOCUMENTS

| | | | | |
|---|---|---|---|---|
| 6,091,114 A | * | 7/2000 | Mogul et al. | 257/360 |
| 6,302,504 B1 | * | 10/2001 | Imanaka et al. | 347/9 |
| 6,414,740 B1 | | 7/2002 | Hosoyamada | |
| 6,773,977 B1 | * | 8/2004 | Reynes et al. | 438/237 |
| 2001/0048421 A1 | | 12/2001 | Nakamura et al. | |

FOREIGN PATENT DOCUMENTS

| | | |
|---|---|---|
| JP | 4-34519 A | 2/1992 |
| JP | 2000-9547 A | 1/2000 |
| JP | 2000-307403 A | 11/2000 |
| JP | 2000-338518 A | 12/2000 |
| JP | 2001-336987 A | 12/2001 |
| JP | 2003-329999 A | 11/2003 |
| JP | 2004-226470 A | 8/2004 |

* cited by examiner

*Primary Examiner* — Tina Wong  
(74) *Attorney, Agent, or Firm* — Birch, Stewart, Kolasch & Birch, LLP (57) ABSTRACT

A liquid crystal panel comprises a temperature sensor (1) formed on a glass substrate (11). The temperature sensor (1) includes two junction structures (2) and (5). The junction structure (2) is formed such that two different semiconductor films (3) and (4) are joined together. The junction structure (5) is formed such that two different semiconductor films (6) and (7) are joined together. The liquid crystal panel outputs divided voltage between the voltage applied to the junction structure (2) and the voltage applied to the junction structure (5) as the voltage depending on the temperature of the liquid crystal panel. As the result, the liquid crystal panel comprising the temperature sensor (1) of simple structure and high performance is provided.

8 Claims, 6 Drawing Sheets

DISPLAY PANEL AND DISPLAY DEVICE

FIELD OF THE INVENTION

The present invention relates to a display panel and display device comprising a temperature sensor.

BACKGROUND OF THE INVENTION

It is known that display quality of liquid crystal display device significantly varies with a temperature of the device. This is attributed to the fact that liquid crystal properties (such as response speed) which influence display quality, have a certain temperature dependency.

Accordingly, some liquid crystal display devices have been proposed, in which the temperature of liquid crystal display device, in particular the temperature of display panel or liquid crystal itself is measured, so that improvement of the display quality can be carried out based on the measurement.

Patent Literature 1 discloses a liquid crystal display device comprising a liquid crystal cell having substrates facing each other with counter electrodes, and liquid crystal is sealed between the substrates, wherein a temperature compensation sensor including a polysilicon resistive element is provided in the liquid crystal cell. This liquid crystal display device allows an easy configuration of a circuit for temperature compensation.

Patent Literature 2 discloses a liquid crystal display device using a temperature sensor for measuring temperature based on an oscillating frequency of a ring oscillator, which is made of the same material as TFT for drive circuit and produced concurrently by the process for producing the TFT. With this liquid crystal display device, display defect resulting from a temperature change of liquid crystal panel can be solved thereby attaining high quality display property.

Patent Literature 3 discloses a liquid crystal display device comprising a liquid crystal display panel having such a structure that a liquid crystal material is sandwiched between a first substrate and a second substrate, wherein a manufacturing process of a first semiconductor element for driving a liquid crystal pixel formed on the first substrate is utilized to produce a second semiconductor element for detecting the temperature of the liquid crystal material in the liquid crystal display panel. This liquid crystal display device requires no cost increase to achieve accurate temperature measurement during operation of liquid crystal material and accurate control of liquid crystal drive voltage based on the temperature measurement.

Patent Literature 4 discloses a liquid crystal display device comprising temperature detecting means for directly detecting the temperature of the liquid crystal inserted in a liquid crystal display pixel to output a detection signal and driving control means for controlling the period of inverted signal polarity of display signal voltage applied to the liquid crystal display pixel based on the detection signal. This liquid crystal display device achieves low power consumption, together with the display image quality in which occurrences of flickers are reduced.

Patent Literature 1
Japanese Unexamined Patent Publication No. 34519/1992 (Tokukaihei No. 04-34519) (Publication Date: Feb. 5, 1992)
Patent Literature 2
Japanese Unexamined Patent Publication No. 2000-9547 (Tokukai No. 2000-9547) (Publication Date: Jan. 14, 2000)
Patent Literature 3
Japanese Unexamined Patent Publication No. 2000-338518 (Tokukai No. 2000-338518) (Publication Date: Dec. 8, 2000)
Patent Literature 4
Japanese Unexamined Patent Publication No. 2004-226470 (Tokukai No. 2004-226470) (Publication Date: Aug. 12, 2004)

DISCLOSURE OF THE INVENTION

However, the above-mentioned conventional arts cannot simultaneously satisfy both of simplifying the structure of a temperature sensor to be provided in a liquid crystal display and improving the performance of the temperature sensor. For example, in the temperature sensor of Patent Literature 1, temperature coefficient of the sensor, i.e. a coefficient of how much resistance value varies with respect to temperature change, is not high enough. Thus temperature change cannot be detected with accuracy. Also in Patent Literature 2, in which a ring oscillator constitutes the temperature sensor, the arrangement of the temperature sensor is complicated and the manufacture thereof requires much time and effort.

The present invention is accomplished in order to solve the aforementioned problems. An object of the present invention is to provide a display panel and display device comprising a temperature sensor of simple structure and high performance.

In order to solve the aforementioned problems, a display panel according to the present invention comprises a temperature sensor for outputting a voltage that depends on a temperature of the display panel, the temperature sensor including at least one junction structure in which a plurality of different semiconductors are joined together.

According to the arrangement, the display panel comprises a temperature sensor for measuring the temperature of the display panel. The temperature sensor includes at least one junction structure in which a plurality of semiconductors are joined together. Here, the plurality of semiconductors which constitute the junction structure differ from one another.

Such a junction structure can have higher temperature coefficient compared with resistive element such as single semiconductor or conductor. Therefore, the temperature sensor including such a junction structure can measure temperature with more accuracy than the temperature sensor made of single resistive element.

Further, the junction structure has such a simple structure that a plurality of semiconductors are joined together. Accordingly, the production of the temperature sensor including the junction structure to the display panel requires little time and effort.

As described above, this arrangement advantageously enables to provide a liquid crystal display panel comprising a temperature sensor of simple structure and high performance.

Further in the display panel according to the present invention, the temperature sensor preferably includes a plurality of said junction structures for dividing a voltage to obtain the voltage that depends on the temperature of the display panel.

This arrangement requires no external circuit to take out voltage of the temperature sensor, in contrast to the case where the temperature sensor includes one junction structure. Therefore, the number of components can be reduced and the arrangement of display device comprising display panel can effectively be simplified.

Further in the display panel according to the present invention, the plurality of junction structures are preferably connected with one another via a conductor(s). The property of junction structure will change if they are directly connected with one another. Here in the arrangement, however, the plurality of junction structures are not directly connected with one another, so that the property of the individual junction structure does not improperly change departing from the expectation. Therefore, the arrangement advantageously enables to provide the display panel with a temperature sensor having desired property.

Further in the display panel according to the present invention, the temperature sensor preferably includes a capacitor connected in parallel with the junction structure. In this arrangement, an AC voltage being present outside of the junction structure is cut off by the capacitor and is not fed over the junction structure. This makes it possible to prevent occurrences of noises in the junction structure thereby effectively improving the temperature detection accuracy of the temperature sensor.

Further in the display panel according to the present invention, the temperature sensor is preferably provided in a location in the display panel, which location corresponds to the light-shielding region within the display panel. According to the arrangement, the temperature sensor does not shield the light passing through the display panel. If, for example, the display panel is a liquid crystal panel, the temperature sensor is not irradiated with the incident light from backlight, which passes through the liquid crystal layer.

As the result, the energy of the incident light does not influence over the temperature sensor, so that the temperature sensor can better stabilize the generation of voltage depending on the resistance, compared with the case where the temperature sensor is irradiated with the light. Also, the property of the junction structure will change upon the irradiation with the light. In the arrangement, however, since the junction structure is not irradiated with the light, the property of the junction structure can be kept constant during the operation of the display panel and consequently the property of the temperature sensor can also be kept constant.

In addition, the temperature sensor does not shield the light passing through the display panel. Accordingly, the temperature sensor does not scatter the light or reduce the amount of the light, in contrast to the case in which the temperature sensor is provided in a location in the display panel, which location light passes through, such as a location corresponding to a color filter. Therefore, the temperature sensor does not reduce the performance of the display panel.

In order to solve the aforementioned problems, the display device according to the present invention comprises any one of the display panels described above.

This arrangement advantageously enables to provide a display device comprising a display panel including a temperature sensor of simple structure and high performance.

Additional objects, features, and strengths of the present invention will be made clear by the description below. Further, the advantages of the present invention will be evident from the following explanation in reference to the drawings.

REFERENCE SIGNS LIST

1 Temperature sensor
2 Junction structure
3 Semiconductor film (semiconductor)
4 Semiconductor film (semiconductor)
5 Junction structure
6 Semiconductor film (semiconductor)
7 Semiconductor film (semiconductor)
8 Electrode
9 Electrode
10 Electrode
11 Glass substrate
12 Base coat layer
13 Interlayer insulating film
15 Sealing material layer
16 Black matrix
17 Glass substrate
18 Electrode
19 Capacitor
20 Electrode
21 Electrode
22 Capacitor
23 Capacitor
50 Liquid crystal panel (display panel)
51 Edge region
52 Display region

BEST MODE FOR CARRYING OUT THE INVENTION

The following description set forth an embodiment of the present invention in reference to FIGS. 1 to 8.

[Basic Configuration of a Temperature Sensor 1]

FIG. 1(a) illustrates a temperature sensor 1 according to the present embodiment in a top view from above a liquid crystal panel 50. FIG. 1(b) illustrates the temperature sensor 1 in a cross sectional view laterally from the liquid crystal panel 50. FIG. 1(b) specifically shows the cross section taken along the dashed line D in FIG. 1(a).

As shown in FIG. 1(a), the temperature sensor 1 according to the present embodiment comprises two junction structures 2 and 5. The junction structure 2 is formed such that two semiconductor films 3 (semiconductor) and 4 (semiconductor) are joined together. The semiconductor films 3 and 4 are different from one another in temperature coefficient. On the other hand, the junction structure 5 is formed such that two semiconductor films 6 (semiconductor) and 7 (semiconductor) are joined together. The semiconductor films 6 and 7 are different from one another in temperature coefficient.

In addition to the two junction structures 2 and 5, the temperature sensor 1 also comprises electrodes 8, 9 and 10. In the temperature sensor 1, as shown in FIG. 1(a), one end of the junction structure 2 is connected with the electrode 8 and the other end of the junction structure 2 is connected with the electrode 9. Meanwhile, one end of the junction structure 5 is connected with the electrode 10 and the other end of the junction structure 5 is connected with the electrode 9.

That is, the junction structures 2 and 5 are connected with each other via the electrode 9. However, as shown in FIG. 1(b), there is a layer made of insulative material between the semiconductor film 4 and the semiconductor film 6, so that the junction structures 2 and 5 are not directly connected with each other.

The temperature sensor 1 is formed on a glass substrate 11 constituting the liquid crystal panel 50. A production process for producing TFT or various wiring layers in the liquid crystal panel is utilized to form the temperature sensor 1. The production process uses polysilicon. Specifically, as shown in FIG. 1(b), respective components constituting the temperature sensor 1 are laminated on a base coat layer 12 formed on the glass substrate 11 by the polysilicon semiconductor process.

The temperature sensor 1 is produced in such a way that the semiconductor films 3 to 7, interlayer insulating film 13 and the electrodes 8 to 10 are stacked in order on the base coat layer 12 made of silicon dioxide. In this case, the general polysilicon production process for providing TFT and the like in the liquid crystal panel 50 is also used to produce the temperature sensor 1. The semiconductor films 3 to 7, for example, are formed by utilizing a gate wiring layer, a source wiring layer, a N+type layer, an I type layer or the like. Therefore, no other special process is required to produce the temperature sensor 1.

In other words, the semiconductor films 3 to 7 is produced on the base coat layer 12 in such a manner that a polysilicon layer is firstly formed on the base coat layer 12. Next, the polysilicon layer is doped with impurities, such as phosphor ion or boron ion to produce a semiconductor film. Here, the type or amount of the impurity, or the frequency of the doping can be changed in order to produce a semiconductor layer with desired electric properties. For example, the semiconductor films 3 to 7 can be configured to have the different resistances or temperature coefficients (temperature dependencies of the resistances).

The aforementioned process allows the production of each junction structure 2 and 5 in the temperature sensor 1 as junction structure in which two different semiconductors are joined together, respectively.

Further, when forming the electrodes respectively, metals such as aluminum, tantalum, tungsten and silver may suitably be used.

(Location where the Temperature Sensor 1 is Provided)

Figure 1:
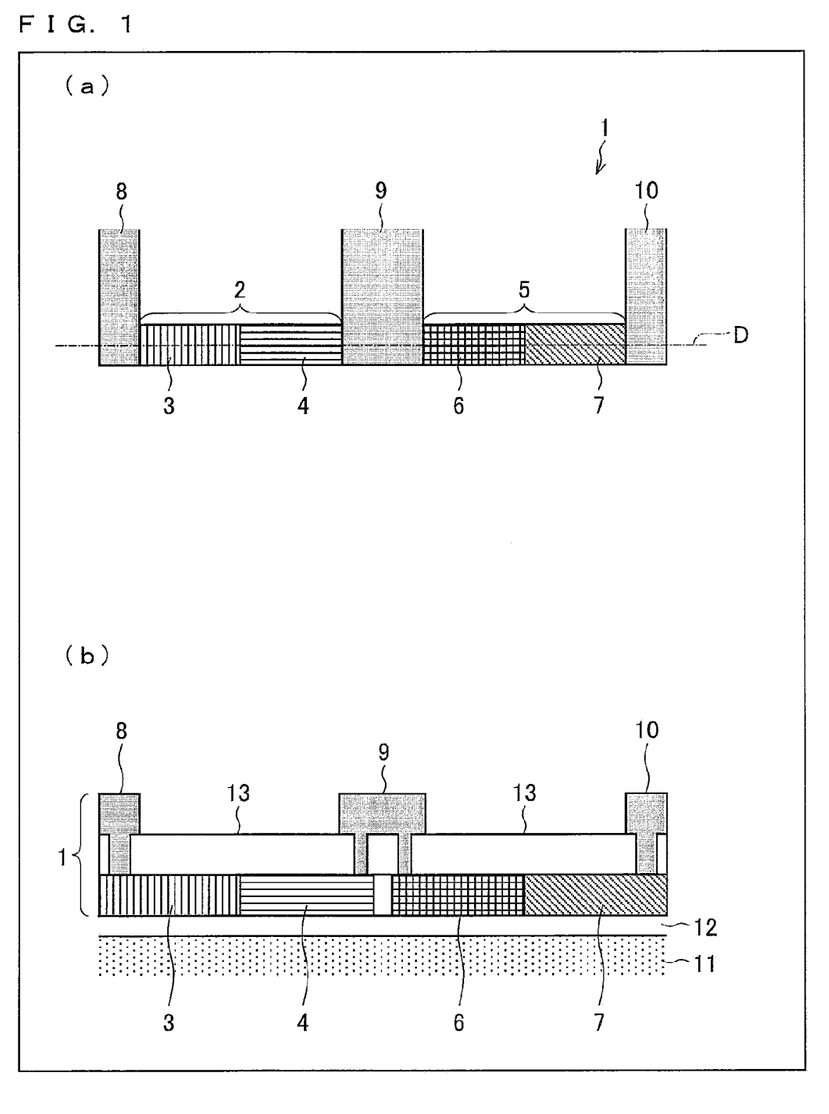
FIGS. 1(a) and 1(b) illustrate a temperature sensor according to the present embodiment in a top view (a) from above a liquid crystal panel and in a cross sectional view (b) laterally from the liquid crystal panel.
Figure 2:
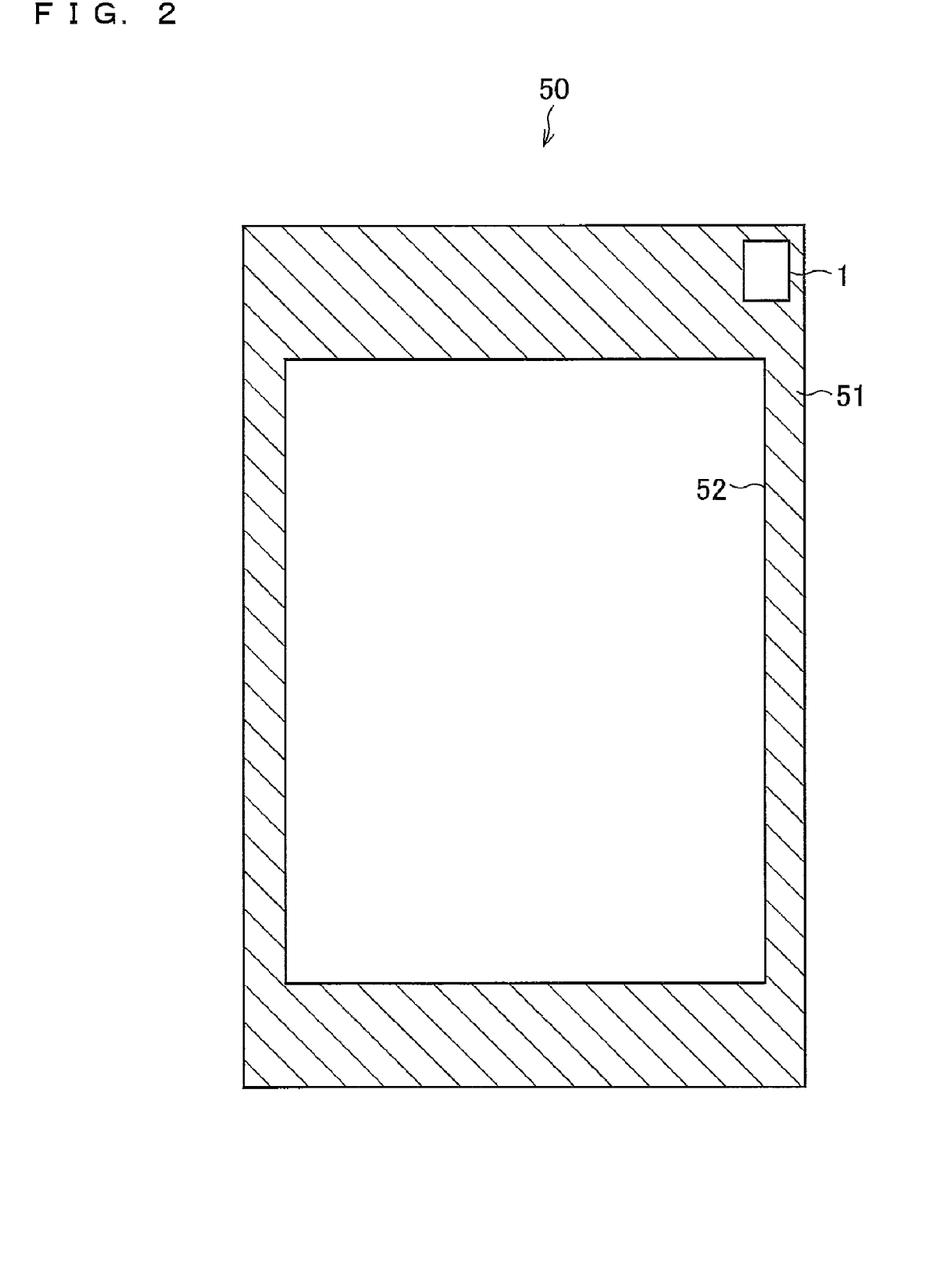
FIG. 2 is a view illustrating a location in the liquid crystal panel where the temperature sensor is formed.

The temperature sensor 1 having the structure described above can be provided in any location in the liquid crystal display 50. As a way of example, the temperature sensor 1 can be provided, as shown in FIG. 2, in an edge region 51 located outside of the display region 52 of the liquid crystal display 50. In this location, the temperature sensor 1 does not affect the liquid crystal layer or TFT provided in the display region 52, so that the liquid crystal display 50 can maintain its display quality as such.

(Equivalent Circuit of the Temperature Sensor 1)

Figure 3:
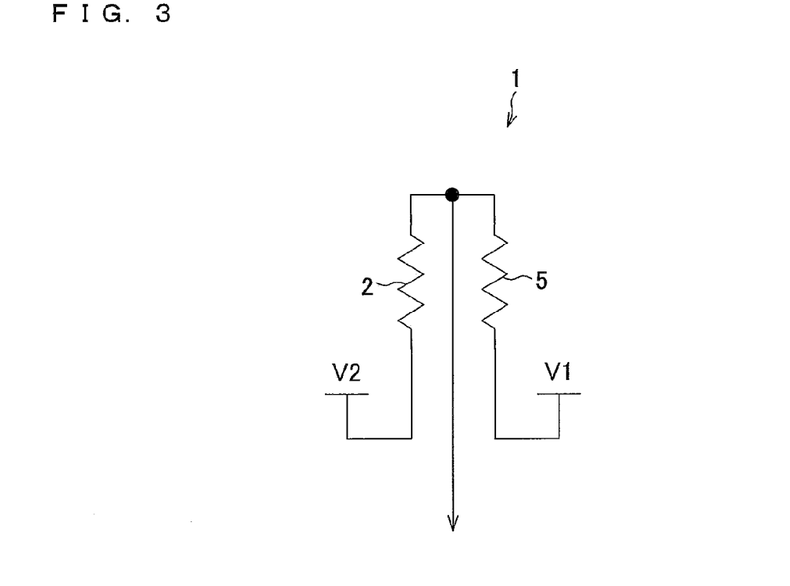
FIG. 3 is a circuit diagram illustrating the temperature sensor.

The temperature sensor 1 has such a property that the entire resistance is varied with the temperature of the liquid crystal display 50. The property results from the temperature dependency of the resistances in the junction structure 2 and 5. In brief, it is considered that the temperature sensor 1 is equivalent to the circuit shown in FIG. 3. FIG. 3 is a circuit diagram illustrating the temperature sensor 1.

When the temperature of the liquid crystal display 50 is measured by the temperature sensor 1, different voltages are respectively applied to the electrodes 8 and 10 disposed on the both ends of the temperature sensor 1. In the example of FIG. 3, the voltage V1 is applied to the electrode 10 connected with the junction structure 5, while the voltage V2 is applied to the electrode 10 connected with the junction structure 2, where V1>V2, or vice versa.

The applied voltages V1 and V2 are divided by the resistance R1 of the junction structure 5 and the resistance R2 of the junction structure 2. Therefore, the divided voltage Vt is output from the electrode 9 as a voltage reflecting the temperature of the liquid crystal panel 50. Concretely, the output voltage Vt is defined by the following formula (1):

$$Vt = V2 + (V1-V2) \times (R2 \div (R1+R2)) \quad (1),$$

where V1>V2.

A temperature measurement circuit is provided external to the liquid crystal panel 50. The temperature measurement circuit receives the input of Vt from the temperature sensor 1. The measurement circuit is to determine the temperature of the liquid crystal panel 50 based on the input Vt. In this case, the determination may be carried out by using a table in which the Vt and the temperature are coordinated or by using a function defining the relation between the Vt and the temperature.

As described above, the temperature sensor 1 outputs the voltage Vt which reflects the temperature of the liquid crystal panel 50 through dividing resistance voltages of the two junction structures 2 and 5. In other words, the temperature sensor 1 can (i) directly determine the analog voltage Vt which varies with the temperatures of the liquid crystal panel 50 to which the own resistance (combined resistance of the junction structures 2 and 5) is reflected, and (ii) output it to the external temperature measurement circuit. Therefore, it is possible to simplify the circuit configuration of the temperature sensor 1 thereby preventing adverse effects of noises.

Further, no other special circuit for measuring the Vt is required outside of the liquid crystal panel 50. The downsizing of the total liquid crystal panel 50 can thus be achieved.

(Example of a Location where the Temperature Sensor is Provided)

Figure 4:
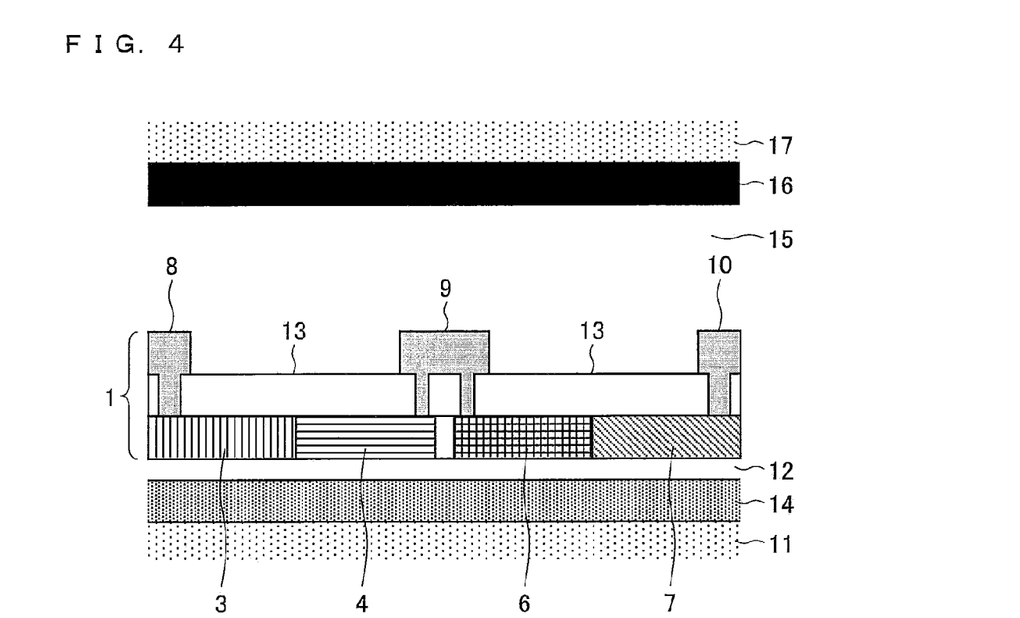
FIG. 4 is a view illustrating how the temperature sensor is positioned where light passing through the liquid crystal panel is shielded.
Figure 5:
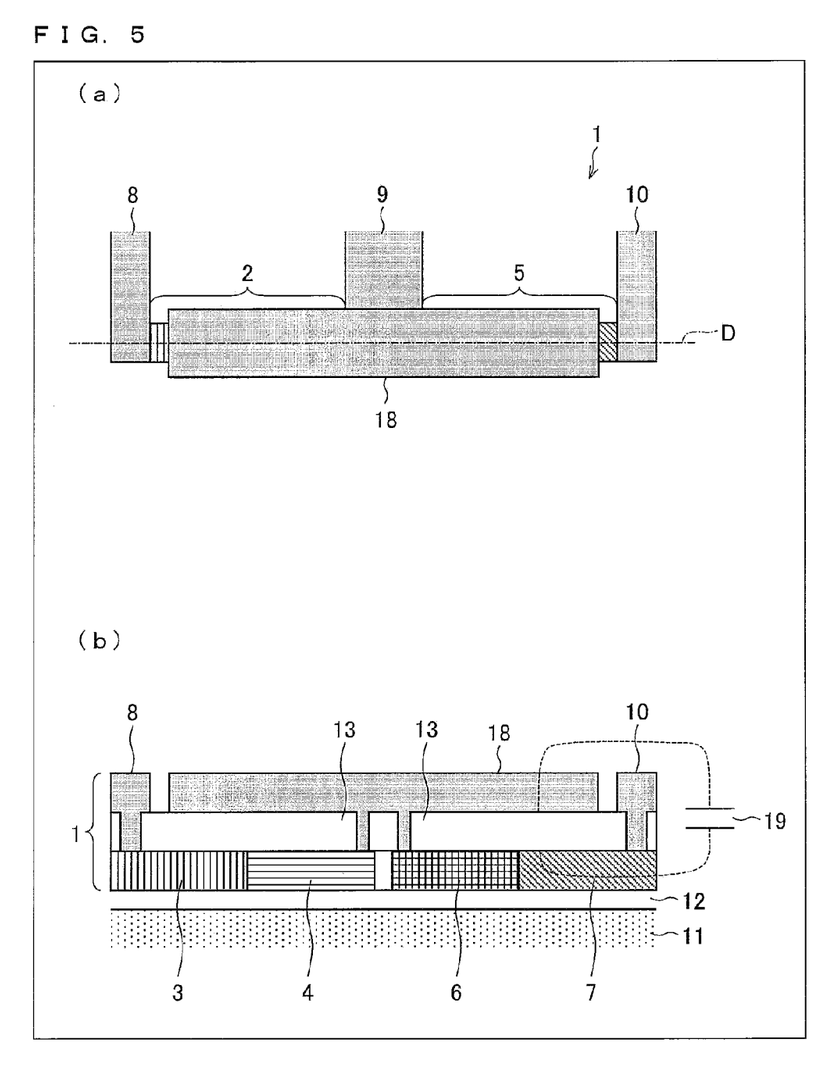
FIGS. 5(a) and 5(b) illustrate a temperature sensor having a further electrode in a top view (a) from above the liquid crystal panel and in a cross sectional view (b) laterally from the liquid crystal panel.
Figure 6:
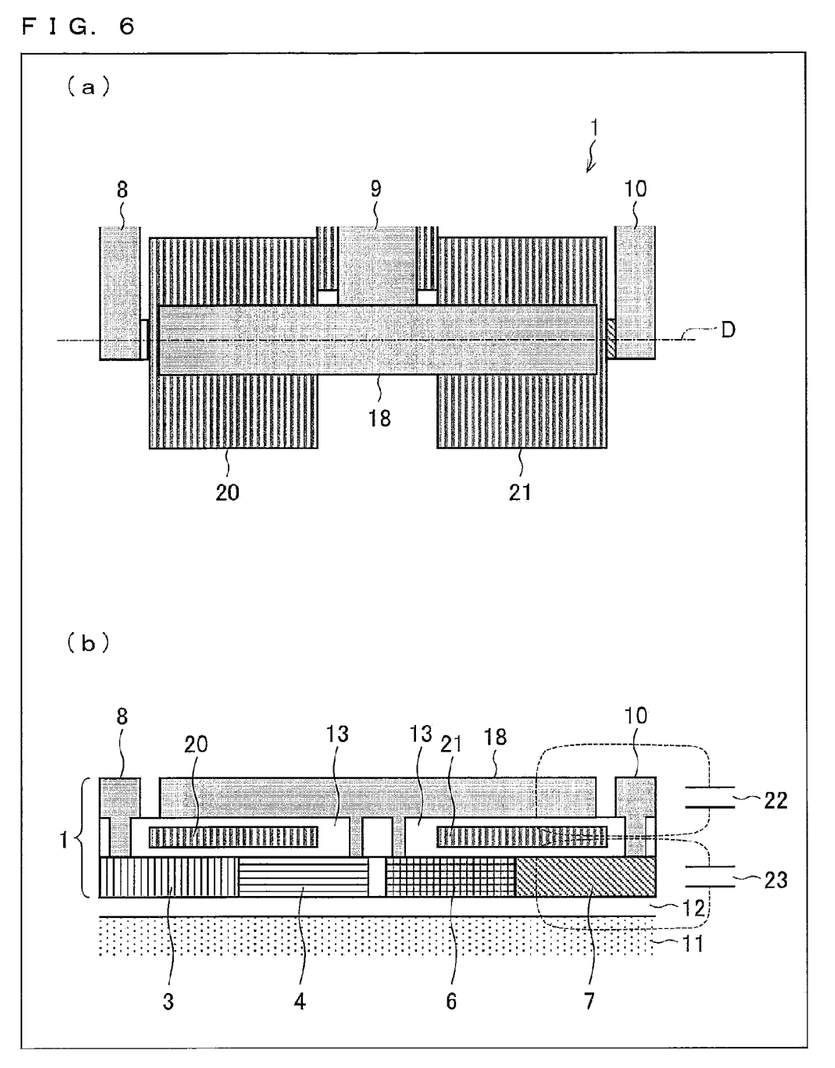
FIGS. 6(a) and 6(b) illustrate a temperature sensor having yet further electrodes in a top view (a) from above the liquid crystal panel and in a cross sectional view (b) laterally from the liquid crystal panel.

The temperature sensor 1 can be provided in any location within the liquid crystal panel 50, preferably where the temperature sensor 1 does not disturb the liquid crystal panel 50 in its operation and functionality. As shown in FIG. 4, for example, the temperature sensor 1 is preferably provided in a location where the light coming from the backlight does not pass through.

FIG. 4 is a view illustrating how the temperature sensor 1 is provided in a location where the light passing through the liquid crystal panel 50 is shielded. In the example of the FIG. 4, a color filter including a black matrix 16 is provided on a glass substrate 17. On the other hand, the temperature sensor 1 is provided in a location in the glass substrate 11, which corresponds to the location where the black matrix 16 (light-shielding portion) is formed on the glass substrate 17. In other words, the temperature sensor 1 is formed in a location in the glass substrate 11 where the black matrix 16 hides the temperature sensor 1 when viewed from the opposing glass substrate 17.

Therefore, when the glass substrate 11 and the glass substrate 17 are bonded via a sealing material layer 15, the black matrix 16 shields the incident light coming into the liquid crystal panel 50 thereby keeping it unreachable to the temperature sensor 1.

As the result, firstly, the energy of the incident light does not influence the temperature sensor 1 wholly, so that the temperature sensor 1 can further stabilize the current to be flowed according to the resistance, compared with the case where the temperature sensor is irradiated with the light. Next, the temperature sensor 1 does not shield the light passing through the liquid crystal panel 50. Accordingly, the temperature sensor 1 does not scatter the light or reduce the amount of the light, in contrast to the case in which the temperature sensor 1 is provided in a location in the display panel 50 which location light passes through, such as a location corresponding to the color filter. Therefore, the temperature sensor 1 will not reduce the performance of the display panel 50.

(The Formation of a Capacitor in Parallel)

As shown in FIGS. 5(a) and 5(b), the performance of the temperature sensor 1 can further be improved by increasing the number of the electrodes provided in the temperature sensor 1.

FIG. 5(a) illustrates a temperature sensor 1 having a further electrode 18 in a top view from above the liquid crystal panel 50. FIG. 5(b) illustrates the temperature sensor 1 having the electrode 18 in a cross sectional view laterally from the liquid crystal panel 50.

The temperature sensor 1 in FIG. 5(a) includes the further electrode 18 made of an electrically conductive material. In more detail, the electrode 18 is connected with the central electrode 9 in the temperature sensor 1 as well as stacked on the interlayer insulating film 13. Viewing from above the temperature sensor 50, the electrode 18 is stacked such that it substantially covers the junction structures 2 and 5.

As shown in FIG. 5(b), the insulative interlayer insulating film 13 is formed between the conductive electrode 18 and the semiconductive junction structure 5 (the semiconductor films 6 and 7). These components thus constitute a capacitor 19 formed in parallel with the junction structure 2.

As described above, in the temperature sensor 1 in FIG. 5(b), one capacitor 19 is formed in parallel with one junction structure 5. The capacitor 19 interrupts the AC current (noise component) flowed from the outside of the temperature sensor 1, so that voltage generated in the junction structure 5 can more be stabilized, compared with the case where no capacitor is formed in parallel.

In the temperature sensor 1 illustrated in FIG. 5(b), a further capacitor can also be formed in parallel with the junction structure 2 on the side where the junction structure 2 are connected with the electrode 8, analogous to the side of the junction structure 5. More stabilized voltage is thus generated in the junction structure 2, compared with the case where no capacitor is formed in parallel with the junction structure 2.

(The Formation of Two Capacitors in Parallel)

The performance of the temperature sensor 1 can further be improved by increasing the number of the electrodes provided in the temperature sensor 1.

FIG. 6(a) illustrates a temperature sensor 1 having yet further electrodes 20 and 21 in a top view from above the liquid crystal panel 50. FIG. 6(b) illustrates the temperature sensor 1 having the yet further electrodes 20 and 21 in a cross sectional view laterally from the liquid crystal panel 50.

The temperature sensor 1 in FIG. 6(a) includes the further electrodes 20 and 21 made of an electrically conductive material. The electrode 20 is formed inside of the interlayer insulating film 13 stacked on the semiconductor films 3 and 4, as shown in FIG. 6(b). The electrode 21 is formed inside of the interlayer insulating film 13 stacked on the semiconductor films 6 and 7, as shown in FIG. 6(b).

As shown in FIG. 6(b), the insulative interlayer insulating film 13 is formed between the conductive electrode 18 and the conductive electrode 21. These components thus form a capacitor 22 in parallel with the junction structure 5.

As further shown in FIG. 6(b), the insulative interlayer insulating film 13 is also formed between the conductive electrode 21 and the semiconductive semiconductor film 7. These components thus form a capacitor 23 in parallel with a junction structure 5. In this case, a GND potential (ground potential) or a constant potential such as Vt is preferably applied to the electrode 21.

In the temperature sensor 1 in FIG. 6(b), as described above, two capacitors 22 and 23 are formed in parallel with one junction structure 5, respectively. The both capacitors 22 and 23 interrupt the AC current flowed from outside, so that voltage generated in the junction structure 5 can more be stabilized, compared with the case where only one capacitor is formed in parallel with the junction structure 5.

In the temperature sensor 1 in FIG. 6(b), analogous to the side of the junction structure 5, two capacitors may be formed also on the side of the junction structure 2 connected with the electrode 8, the two capacitors being formed in parallel with the junction structure 2. In this case, more stabilized voltage is consequently generated in the junction structure 2, compared with the case where one capacitor is formed in parallel with the junction structure 2.

In this manner, both the current flowed through the junction structure 2 and the current flowed through the junction structure 5 are stabilized, so that accuracy of the temperature measurement using the temperature sensor 1 is improved.

(Temperature Coefficients of Materials Applicable for the Temperature Sensor)

It will be explained in reference to FIG. 7 that the temperature coefficient of the temperature sensor 1 according to the present invention is superior to the conventional sensors.

Figure 7:
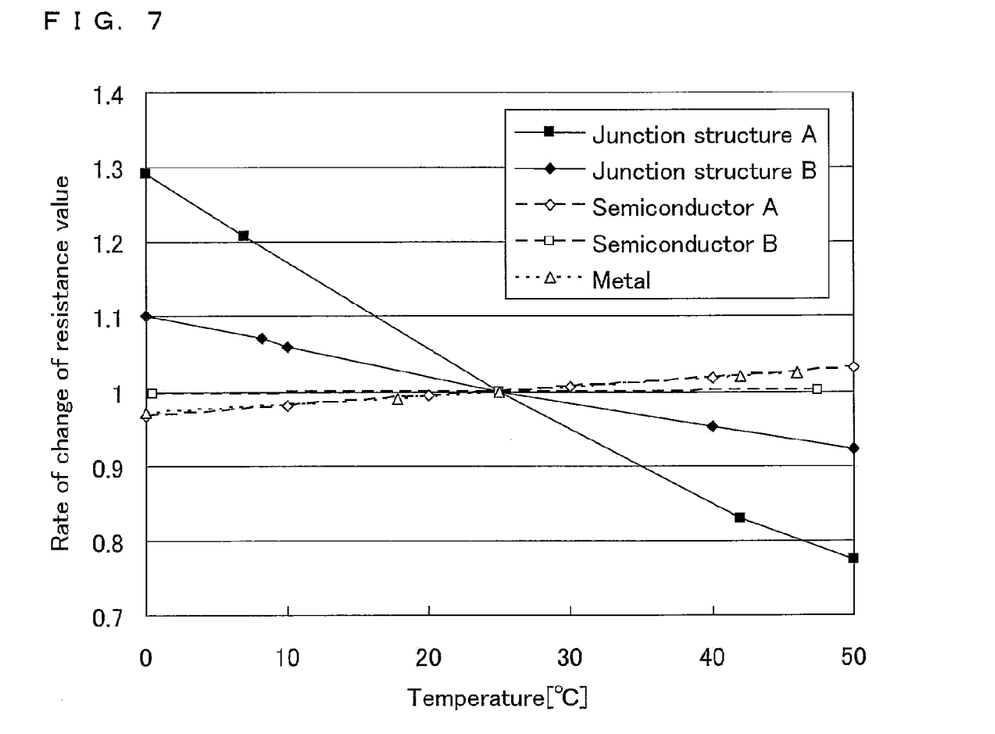
FIG. 7 is a diagram illustrating temperature coefficients of materials applicable for the temperature sensor.

FIG. 7 is a diagram illustrating temperature coefficients of materials applicable for the temperature sensor. Metal in this figure is a common metal, such as copper. Different types of doping are performed to produce a semiconductor A and a semiconductor B. A junction structure A and a junction structure B respectively are configured such that two different types of semiconductors are joined together. Also, the types of the semiconductors constituting the junction structure A and the types of the semiconductors constituting the junction structure B differ from one another. For example, the junction structure A is formed in such a way that the semiconductor A and the semiconductor B are joined together in form A-B-A, the semiconductor A being produced by performing the doping of boron two times as well as of phosphorus one time, and the semiconductor B being produced by only performing the doping of boron two times.

As shown in FIG. 7, the junction structure A has the greatest temperature coefficient, i.e. a coefficient of how much resistance value varies with respect to temperature change (rate of change). The junction structure B has the next greatest temperature coefficient. For the rest, the relation "the semiconductor A>metal>the semiconductor B" is applicable.

It has been shown that the temperature coefficient of junction structure is greater than that of single semiconductor. It is thus understood that the temperature sensor 1 including the junction structure in which a plurality of different semiconductors are joined together has a greater temperature coefficient than the conventional temperature sensor having a resistive element made solely of a semiconductor or a resistive element made solely of a conductive material. In other words, the temperature sensor 1 according to the present invention has better performance than the conventional temperature sensor.

(In the Case where the Temperature Sensor 1 Includes a Junction Structure in which Three or More Types of Semiconductors are Joined Together)

The present invention can also be configured as the temperature sensor including junction structures having three or more types of semiconductors. An example thereof is explained below in reference with FIG. 8.

Figure 8:
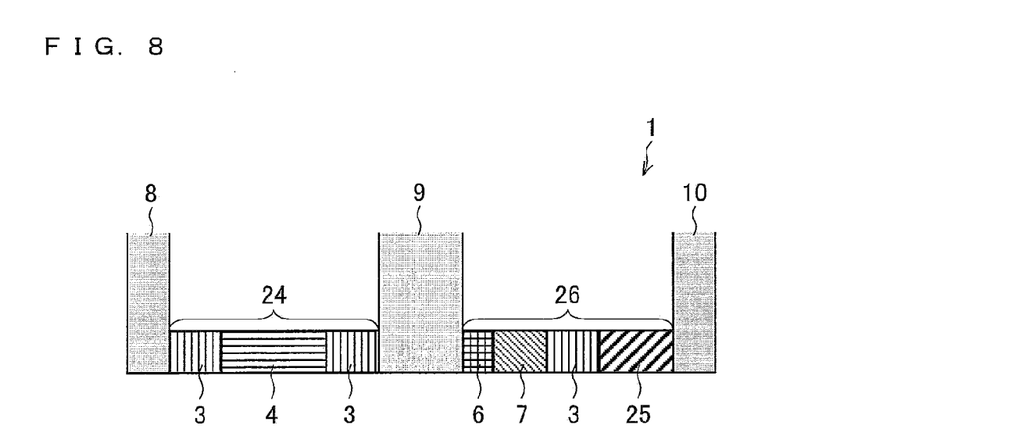
FIG. 8 is a view illustrating a temperature sensor including a junction structure made of three or more types of semiconductors.

FIG. 8 is a view illustrating the temperature sensor 1 including junction structures having three or more types of semiconductors. As shown in FIG. 8, the temperature sensor 1 includes two junction structures 24 and 26. The junction structure 24 is configured in such a way that the semiconductor film 3, the semiconductor film 4 and the semiconductor film 3 are connected with one another in sequence. In the meanwhile, the junction structure 26 is configured in such a way that the semiconductor film 6, the semiconductor film 7, the semiconductor film 3, and the semiconductor 25 are connected with one another in sequence.

Also in this case, such a configuration that semiconductors are joined together depending on their properties makes it possible to increase the temperature coefficients of the junction structures 24 and 26. Therefore, the performance of the temperature sensor 1 to be provided within the display panel 50 can of course be improved.

In addition, optimizing a method for manufacturing semiconductors leads to reduce differences in semiconductor properties, and thereby the properties of respective junction structures can be stabilized.

The present invention is not limited to the description of the embodiments above, but may be altered within the scope of the claims. That is, an embodiment based on a proper combination of technical means suitably altered within the scope of the claims is encompassed in the technical scope of the present invention.

For example, the temperature sensor 1 must not necessarily include two junction structures, but may include at least one junction structure. The temperature sensor 1 may also include three or more junction structures. In other words, the temperature sensor 1 may be just a temperature sensor which includes at least one junction structure in which a plurality of different semiconductors are joined together and outputs voltage depending on the temperature of the liquid crystal panel 50.

Also, the display panel according to the present invention is not limited to the liquid crystal panel 50, but may be configured as other type of display panel, such as an organic EL panel. In this sense, the display device according to the present invention is not limited to the liquid crystal display device, but may be configured as other type of display device, such as an organic EL display, plasma display.

As described above, the display panel according to the present invention comprises the temperature sensor including at least one junction structure in which a plurality of different semiconductors are joined together, wherein the temperature sensor outputs voltage depending on the temperature of the display panel. With this arrangement, therefore, the display panel according to the present invention advantageously enables to provide the liquid crystal display panel comprising the temperature sensor of simple structure and high quality.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable as various display panels which can directly measure the internal temperature and applicable as various display devices comprising such display panels.

What is claimed is:

1. A display panel comprising:
a temperature sensor for outputting a voltage that depends on a temperature of the display panel, the temperature sensor including at least one junction structure in which a plurality of different semiconductors are joined together, wherein
the plurality of different semiconductors are n-type semiconductors doped with different impurities.

2. The display panel according to claim 1, wherein the temperature sensor includes a plurality of the junction structures for dividing a voltage to obtain the voltage that depends on the temperature of the display panel.

3. The display panel according to claim 2, wherein the plurality of the junction structures are connected with one another via a conductor(s).

4. The display panel according to claim 1, wherein the temperature sensor includes a capacitor connected in parallel with the junction structure.

5. The display panel according to claim 1, wherein the temperature sensor is provided in a location in a display region of the display panel, which location corresponds to a light-shielding portion within the display region.

6. The display panel according to claim 1, wherein the temperature sensor is provided in an edge region located outside of the display region of the display panel.

7. A display device, comprising a display panel according to claim 1.

8. The display panel as set forth in claim 1, wherein the plurality of different semiconductors are made by doping a polysilicon layer with phosphorous ions and boron ions.

* * * * *